United States Patent
Mukai

[11] Patent Number: 6,151,810
[45] Date of Patent: Nov. 28, 2000

[54] CONNECTING DEVICE OF SOIL REMOVING MEMBER FOR EXCAVATOR

[76] Inventor: Toshio Mukai, 20-24, Azukimochi 2-chome, Hamamatsu-shi, Shizuoka-ken, Japan

[21] Appl. No.: 09/126,086

[22] Filed: Jul. 30, 1998

[51] Int. Cl.[7] .............................. F16D 1/00; B25G 3/00; E02F 3/24
[52] U.S. Cl. ........................... 37/350; 37/189; 403/325; 403/348; 175/320; 175/323
[58] Field of Search ............... 37/189, 252, 350, 37/362, 462; 403/325, 348; 175/320, 323; 285/31, 80, 138

[56] References Cited

U.S. PATENT DOCUMENTS

| | | | |
|---|---|---|---|
| 4,361,196 | 11/1982 | Hoyle, Jr. .................................. | 175/320 |
| 4,986,690 | 1/1991 | Cooksey .................................. | 403/319 |
| 5,052,849 | 10/1991 | Zwart ...................................... | 403/300 |
| 5,086,843 | 2/1992 | Mims et al. .............................. | 166/380 |
| 5,188,399 | 2/1993 | Durina ..................................... | 285/91 |
| 5,575,409 | 11/1996 | Gruendeman ............................ | 222/459 |
| 5,651,570 | 7/1997 | Schrum et al. .......................... | 294/1.1 |
| 6,007,268 | 12/1999 | Whittington et al. ................... | 403/328 |

Primary Examiner—Eileen D. Lillis
Assistant Examiner—Gary S. Hartmann
Attorney, Agent, or Firm—Kanesaka & Takeuchi

[57] ABSTRACT

A connecting device of a soil removing member for an excavator is used for connecting two soil removing members, wherein a helical ejecting blade is attached on an outer periphery of a rotational shaft. The rotational shaft in one soil removing member is connected to another rotational shaft of another soil removing member in accordance with excavation. The connecting member is basically formed of an inserting member disposed at one end of the rotational shaft, and a receiving member provided at the other end of the rotational shaft.

7 Claims, 8 Drawing Sheets

CONNECTING DEVICE OF SOIL REMOVING MEMBER FOR EXCAVATOR

BACKGROUND OF THE INVENTION AND RELATED ART STATEMENT

The present invention relates to a connecting device of a soil removing member for an excavator, which is used in a construction for laying a pipe member underground.

In an underground construction under a road or river for laying a pipe member, for example a water pipe or gas pipe, a departure or starting pit and an arrival pit are dug at both sides of the construction, and in the departure pit, a digging apparatus such as a ground boring machine is disposed to install the pipe member while digging and moving toward the arrival pit. Accordingly, excavated soil and sand at a front part of the pipe are sent out rearwardly by an auger screw provided inside the pipe member.

In this pipe-inserting or installing work, while the pipe member is advanced and extended under the ground, the auger screw is extended by a predetermined connecting member.

Conventionally, as the connecting member for the auger screw, for example, structures as shown in FIGS. 9(a)–9(d) are known. In the case shown in FIG. 9(a), a male screw 51 projected at one end of one rotational shaft 50 engages a female screw 52 bored in the other end of another rotational shaft 50 to connect the same.

Also, in the case shown in FIG. 9(b), one end and the other end of the rotational shaft 50' are provided with rectangular pipe like attaching portions 53, 54, and a retractable knock 55 is attached on an outer periphery of the attaching portion 53. After the attaching portions 53, 54 are fitted, the knock 55 is engaged with a receiving hole 56 in the other attaching portion 54 to connect the attaching portions 53, 54.

In the case shown in FIG. 9(c), one end and the other end of the rotational shaft 50a are provided with rectangular pipe like attaching portions 53a, 54a, wherein after both attaching portions 53a, 54a are fitted, parts of through holes 57, 57' in the attaching portions 53a, 54a are firmly tightened by a bolt 58 and a nut 59 to connect the attaching portions 53', 54'.

Further, in the case shown in FIG. 9(d), one end and the other end of rotational shaft 50b are provided with splined attaching portions 53b, 54b, wherein after both attaching portions 53b, 54b are fitted, the attaching portions 53b, 54b are surrounded and held by a connection band 60, which is tightened by a bolt and a nut to connect the attaching portions 53b, 54b.

However, although the connection operations can be easily carried out in these structures, these structures have various problems as follows. In the screw-in type shown in FIG. 9(a), in case the screw does not rotate because sand and soil are stuck in the auger, the screw is reversely rotated to be pulled out, and then inserted again; in this case, by this reverse rotation, the connection at the screw part might be disengaged. On the other hand, after installing the pipe, when the screw is disassembled, loosening of the screw is difficult due to the strong engagement in the positive direction, so that workability of disassembling of the pipe is greatly lowered.

Also, in the fit-in knock type shown in FIG. 9(b), since the strong tensile strength is concentrated on the knock itself, there is a disadvantage that this knock portion tends to break down. Additionally, since a leaf spring for retractably urging the knock is mounted inside the rectangular pipe member, due to storing space therefor, the rectangular pipe has to be formed thin, so that the strength thereof is lowered.

In the fit-in bolt tightening type shown in FIG. 9(c), the bolt is very weak against the torque load, thrust load and distortion force; and especially, damages at the screw of the bolt and the nut portion, or bend of the bolt are frequently happened. Accordingly, there are cases such that the screw portions can not be unscrewed in disassembly, and the bolt and the nut are unscrewed while the device is in use.

Furthermore, in the inserting-band tightening type shown in FIG. 9(d), since the clamping portion of the bolt in the band is protruded outwardly, rocks or the like taken into the inserted pipe hit this clamping portion to cause rotational resistance, so that a large torque for propelling or advancing the machine is necessary, resulting in causing troubles for transferring the removed soils rearwardly. Also, members such as the band, bolt and nut, and tightening tools are necessary, so that connection workability is extremely poor, and workability of detaching and attaching the shafts is drastically lowered.

The present invention has been made to solve the above problems, and an object of the present invention is to provide a connecting device of a soil removing member for an excavator, wherein the work for detaching and attaching the soil removing members with each other can be easily and securely carried out by one-touch operation, and moreover, the outer periphery of the connecting device does not include a projection so that smooth removal of soil can be achieved.

Further objects and advantages of the invention will be apparent from the following description of the invention.

SUMMARY OF THE INVENTION

To achieve the above objects, the present invention provides a connecting device of a soil removing member for an excavator, wherein the soil removing member includes a rotational shaft with a predetermined length and an axially helical ejection blade attached to an outer periphery of the rotational axis. The connecting device connects connecting ends of the rotational shafts to extend the soil removing members in accordance with digging soils, and the connecting device of the invention is formed of an inserting member attached to one end of the rotational shaft and a receiving member attached to another end of the rotational shaft to correspond to the inserting member.

In the connecting device, the inserting member is provided with a main rod having a transmission member fixed to the one end of the rotational shaft for a predetermined length, and a collar disposed in the main rod to protrude radially outwardly from an outer periphery of the main rod, and a rotation control member rotatably attached to the main rod parallel to the collar in an axial direction. The rotation control member selectively and slidably moves between a peripheral position located in the same periphery as that of the collar and an outside position located outside the collar in the axis direction on the outer periphery of the main rod.

The receiving member is provided with a receiving portion attached to the other end of the rotational shaft, and a hollow stopping cylinder which is freely rotatably attached to an outer periphery of the receiving portion. The stopping cylinder includes an engaging rim for engaging the collar of the main rod, and the receiving member includes a transmission receiving concave for fitting the transmission member of the main rod.

Also, the inserting member includes retaining means for retaining a position of the rotation control member when the rotation member corresponds to the same peripheral position which is in the periphery of the collar.

DETAILED DESCRIPTION OF PREFERRED EMBODIMENTS

Figure 1:
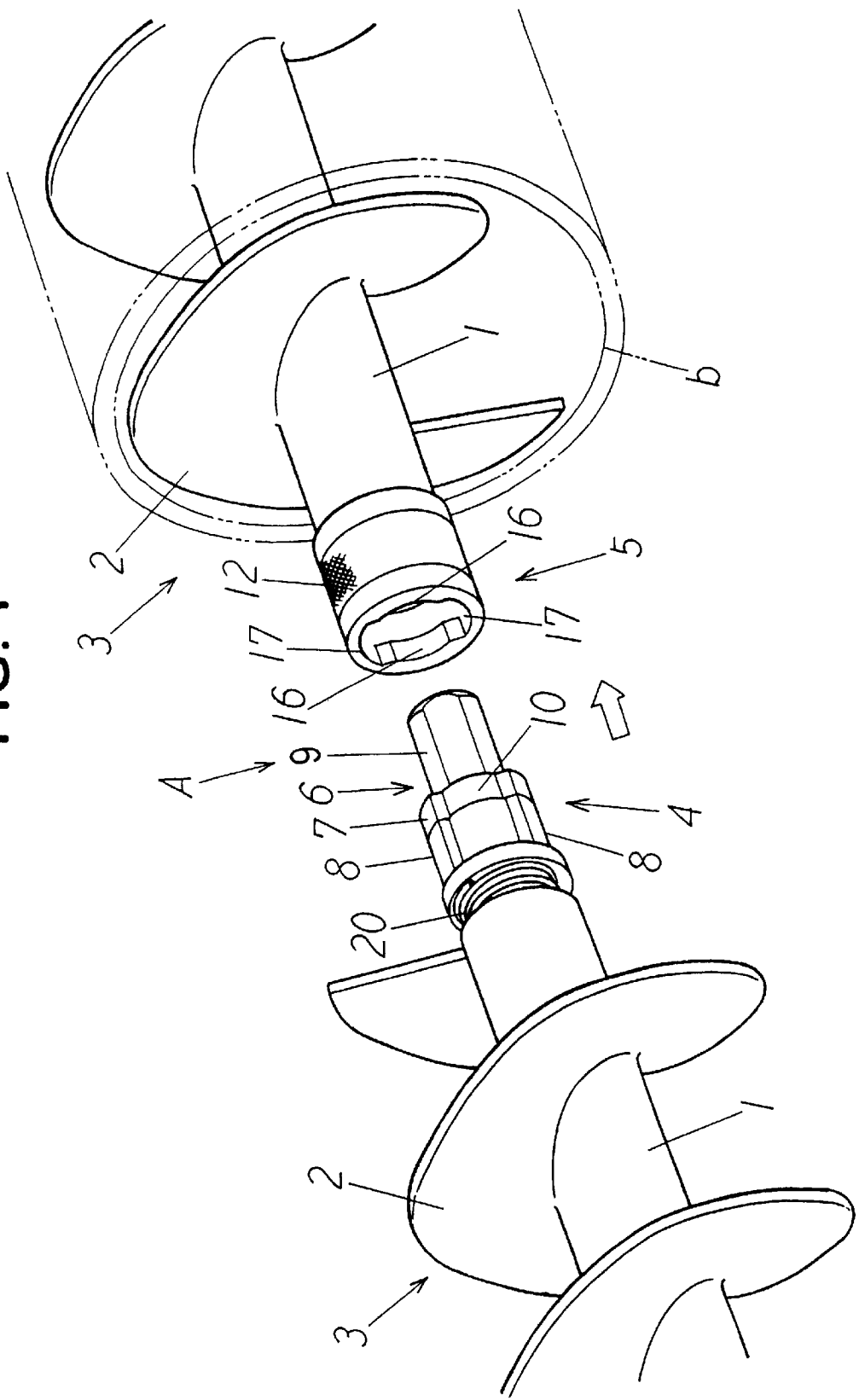
FIG. 1 is a perspective view showing an embodiment of a connecting device of a soil removing member for an excavator according to the present invention.

Hereinafter, embodiments of a connecting device of a soil removing member for an excavator according to the present invention will be explained by referring to the attached drawings.

In FIGS. 1, 4, 6(a), 6(b) and 8, A designates a connecting device of a soil removing member for an excavator according to the present invention, which is used in an underground construction for burying a pipe member b, for example, a water pipe or gas pipe. In this construction, a departure or starting pit and an arrival pit are dug at both sides of the installation site of the pipe member b, and in the departure pit, a propulsion apparatus (not shown), such as a ground boring machine, is disposed and the pipe members are inserted while digging and propelling toward the arrival pit.

Then, a soil removing member 3, such as an auger screw wherein an outer periphery of a rotational shaft 1 with the predetermined length is provided with a helical ejection blade 2 extending in an axial direction of the shaft 1, is disposed inside the pipe member b. The soil removing member 3 transfers dug and removed soil and sand in front of the pipe member b rearwardly, and in accordance with digging soil and inserting the pipe, a new rotational shaft 1 for the soil removing member 3 is connected for extension.

The structure of the device A is basically formed of an inserting member 4 provided at one end of the rotational shaft 1 in the soil removing member 3, and a receiving member 5 provided at the other end of the rotational shaft 1 to correspond to the inserting member 4. The inserting member 4 and the receiving member 5 are respectively provided on both ends of each soil removing member 3, and in case the soil removing member 3 is extended, the inserting member 4 and the receiving member 5 are arranged alternately.

Incidentally, FIG. 1 shows an example wherein the inserting member 4 and the receiving member 5 are provided at side ends of the rotational shafts 1. The rotational shaft 1, which has the inserting member 4 in the figure at one end, is provided with a receiving member 5 (not shown) at the other end, and the rotational shaft 1, which has the receiving member 5 in the figure at one end, is provided with an inserting member 4 (not shown) at the other end.

Figure 2:
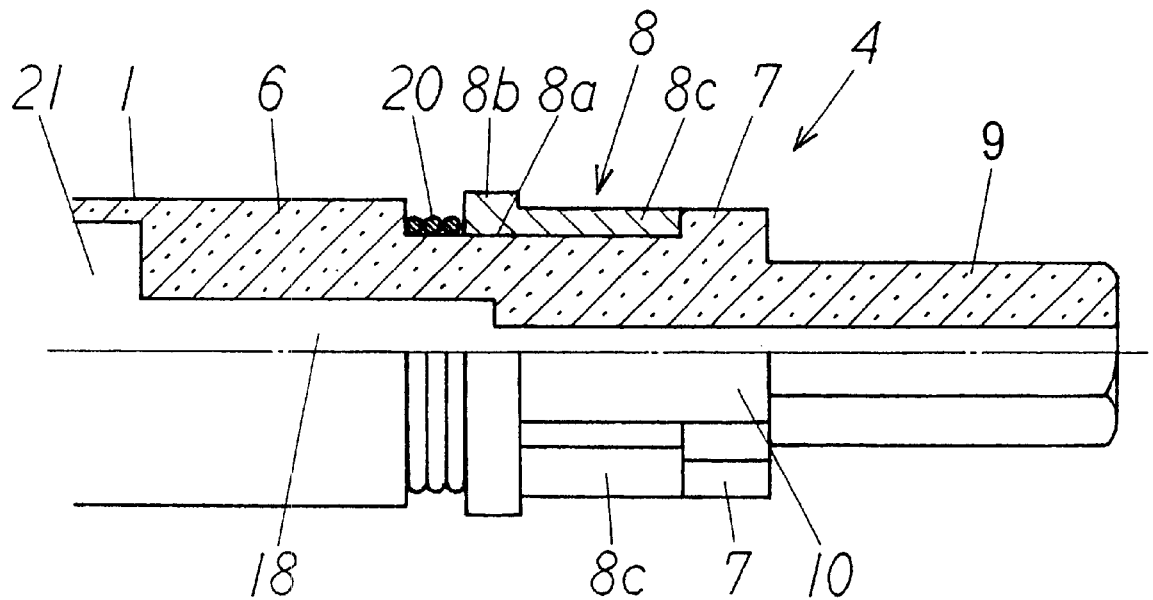
FIG. 2 is a front half-sectional view showing an inserting member in FIG. 1.
Figure 4:
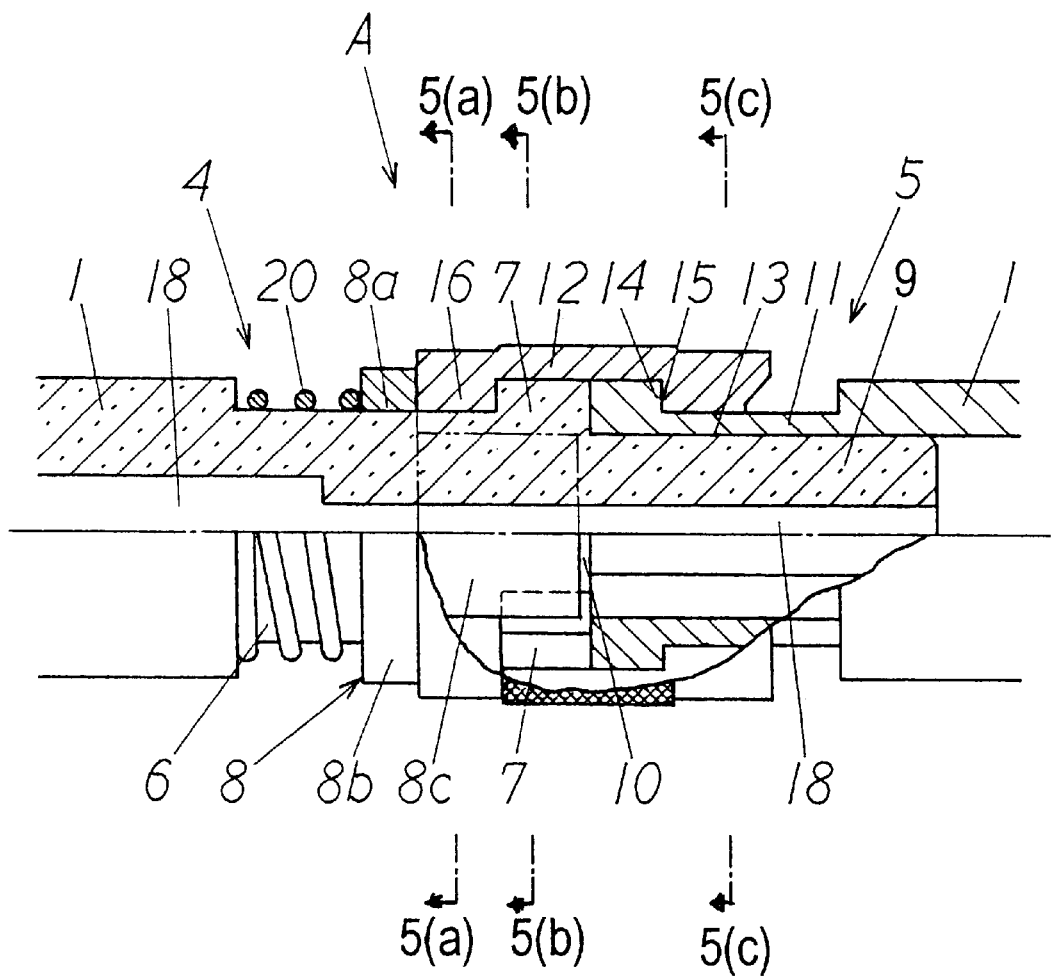
FIG. 4 is a front sectional view explaining a connecting condition of the device in FIG. 1, showing a main part thereof.

And, as shown in FIGS. 2 and 4, the inserting member 4 is formed of a main rod 6, a receiving collar 7, and a rotation control member 8.

Figure 5A:
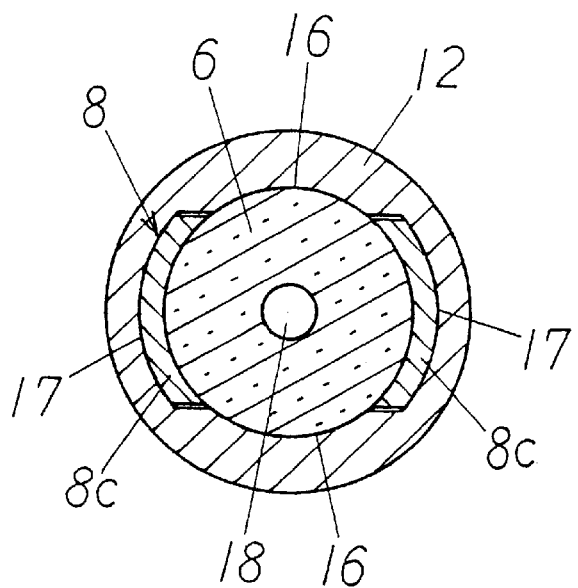
FIG. 5(a) is a cross sectional view taken along line 5(a)–5(a) in FIG. 4.

In the above members, the main rod 6 is used for transmitting rotational force and connecting to the other opposing rotational shaft 1 in case of extending the soil removing member 3, and includes a transmission member 9, which is fixed to one end of the rotational shaft 1 to project for a predetermined length. Although the section of the transmission member 9 is a hexagon in FIG. 1 and FIG. 5(c), it can be freely chosen as long as the shape allows secure transmission of rotation torque toward the other rotational shaft 1. For example, the transmission member 9 can be formed into a shape with a polygon section such as a rectangle section, a spline shape, one or plural grooves, keyway, or the like, though they are not shown in the figures.

Figure 5B:
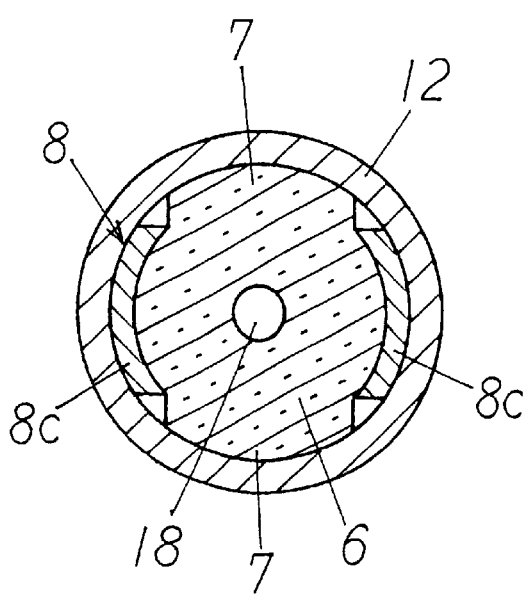
FIG. 5(b) is a cross sectional view taken along line 5(b)–5(b) in FIG. 4.
Figure 5C:
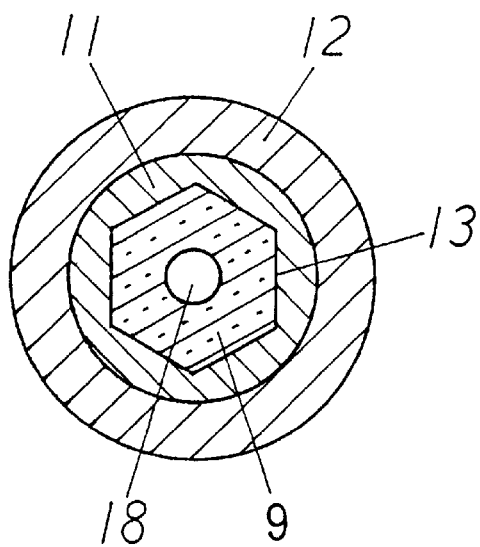
FIG. 5(c) is a cross sectional view taken along line 5(c)–5(c) in FIG. 4.
Figure 6A:
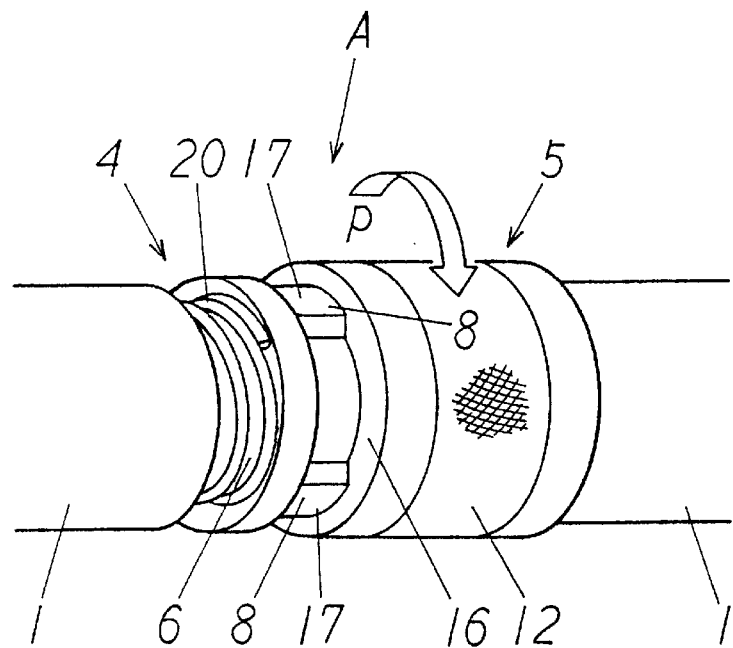
FIGS. 6(a) and 6(b) are perspective views showing connecting conditions of the device in FIG. 1.
Figure 6B:
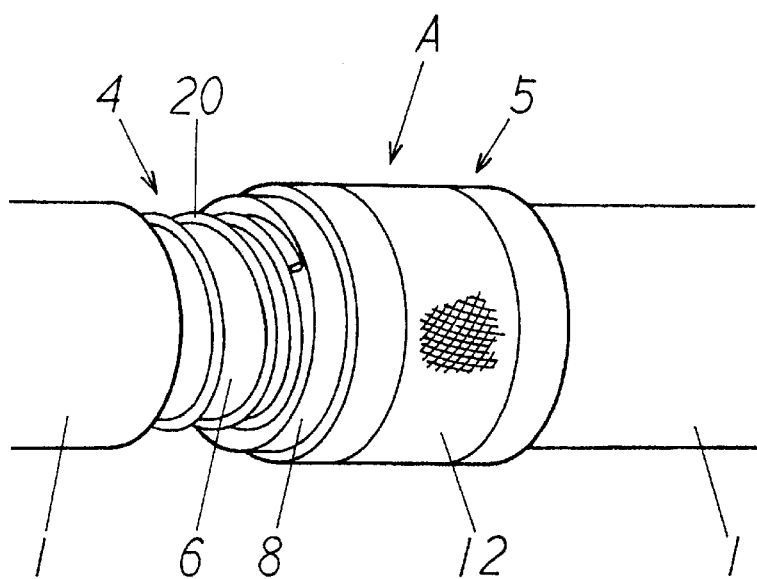

The collar 7 is provided at a base part of the transmission member 9 in the main rod 6, and as shown in FIG. 1 or FIG. 5(b), the collar 7 is protruded from an outer periphery of the main rod 6 radially outwardly at two portions (or at one portion in the radial direction), wherein a side surface thereof is engaged with a side surface of an engaging rim of the receiving member 5 described later.

Figure 7:
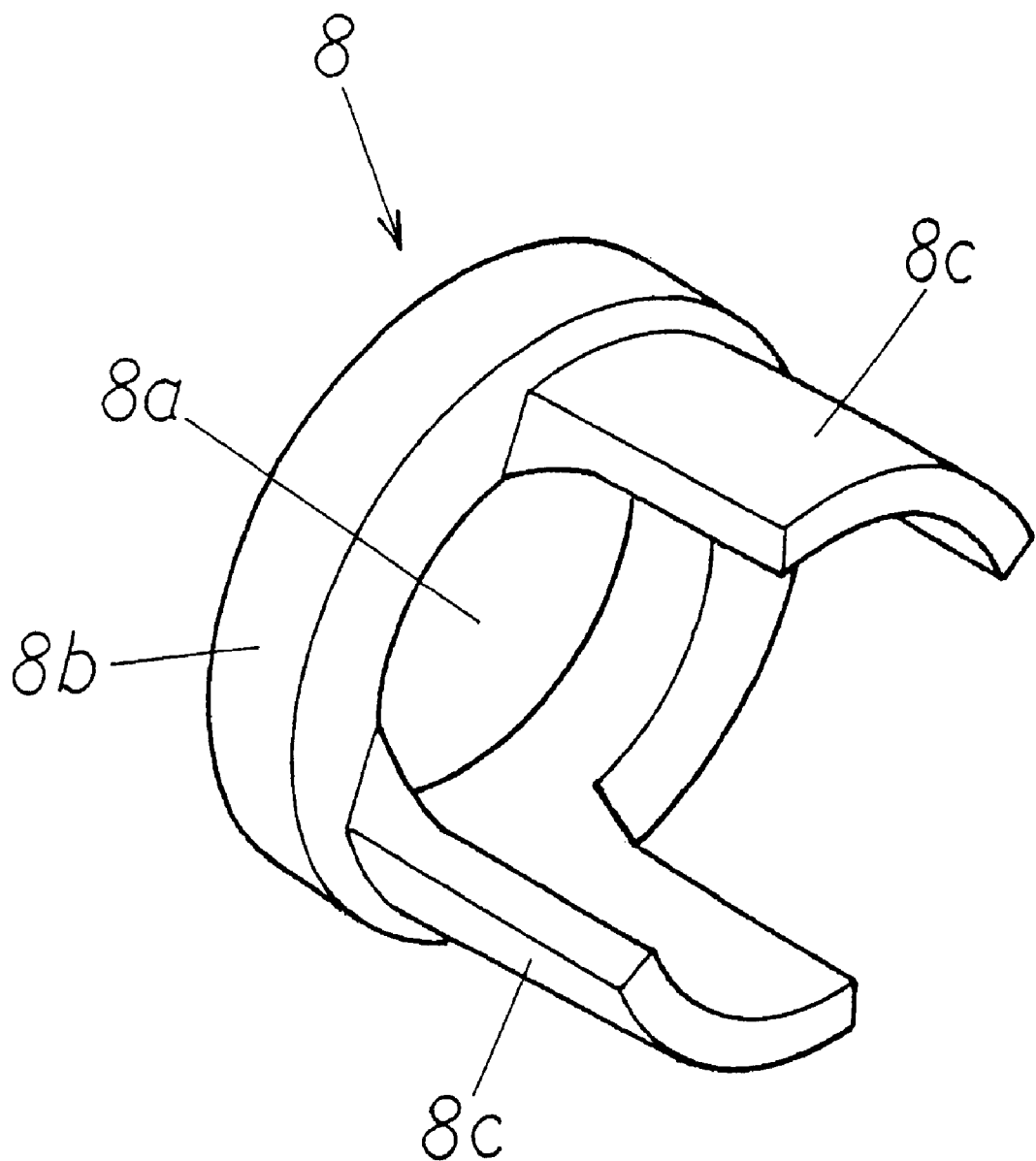
FIG. 7 is a perspective view showing a rotation control member of the inserting member in the device of FIG. 1.

The rotation control member 8 is freely rotatably and slidably attached to the outer periphery of the main rod 6 parallel to the collar 7 in the axial direction. As shown in FIG. 7, the rotation control member 8 is formed of a circular member 8b having a slide hole 8a, two tongue-like members 8c protruding from one side surface of the circular member 8b parallel to the outer periphery of the main rod 6.

And, in the peripheral portion of the main rod 6, the rotation regulation member 8 moves selectively and slidably in the axial direction between the position relative to the collar 7, that is, the position in which the tongue-like members 8c are located in the notch portions 10 to have the same outer periphery with the collar 7, and the outside the receiving collar 7, that is, the position in which the circular member 8b is deviated from the notch portions 10.

Incidentally, a rear end part of the circular member 8b is connected to retaining means 20 for keeping the position of the rotation control member 8, that is, for preventing the rotation control member 8 from wobbling rearwardly (deviating direction) in the axial direction when the rotation control member 8 is positioned to correspond to the position of the collar 7 (referring to FIG. 4). As the retaining means 20, for example, an elastic-mechanism and commonly used stopper, such as a coil spring or a leaf spring, is used.

Also, although not shown in the figures, the outer peripheral portion of the retaining means 20 can be covered by an stretchable outer covering member, so as to avoid the effect of the removed soils or the like.

Figure 3:
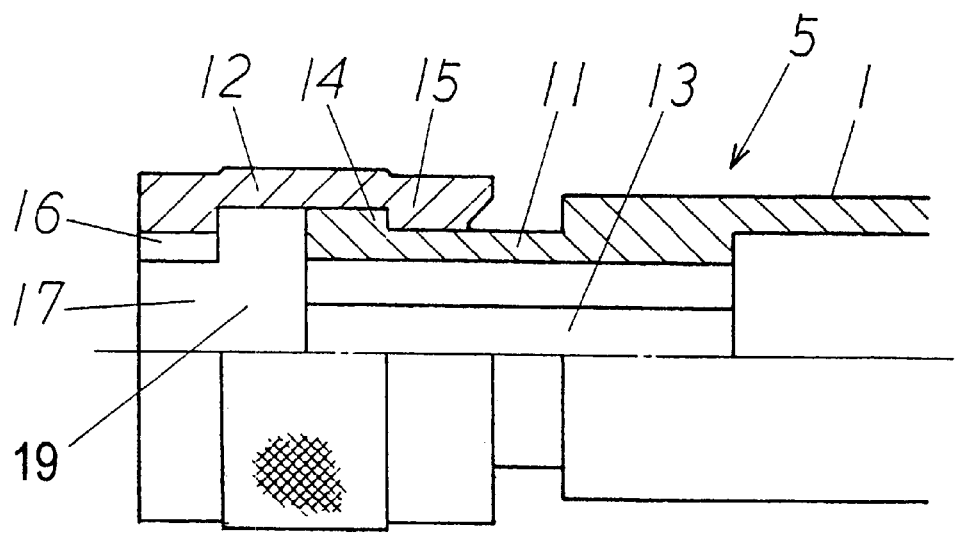
FIG. 3 is a front half-sectional view showing a receiving member in FIG. 1.

The receiving member 5 is used for receiving the inserting member 4 to connect and transfer the rotational force, and as shown in FIGS. 3 and 4, the receiving member 5 is formed of a cylinder member 11 and a stopping cylinder 12.

In these members, the cylinder member 11 includes a transmission-receiving concave 13 in a hole type in the axial direction (in the embodiment of the present invention), or in the groove type which is fixed to the other end of the rotational shaft 1, to engage and fit with the transmission member 9 of the main rod 6. The transmission-receiving concave 13 has a shape whose section corresponds to the section of the transmission member 9, and in the case shown in FIG. 5(*c*), the transmission-receiving concave 13 has the hexagonal section.

The stopping cylinder 12 is formed into a hollow cylindrical shape opened at both ends, and is rotatably attached to an outer periphery of the cylinder member 11. At a rim of one end of the stopping cylinder 12, a stopping member 15 engaging a stopping ring 14 protruded from an outer peripheral end of the cylinder member 11 is provided to project toward an inner periphery of the stopping cylinder 12. On the outer peripheral portion of the stopping cylinder 12, a knurl with the predetermined grooves for preventing slipping at the time of rotation is incised.

Also, at an inner rim of the other end of the stopping cylinder 12, engaging rims 16 engaging the collar 7 of the main rod 6 are provided at two portions to correspond to the collar 7. For insertion from an opening of the stopping cylinder 12, passing parts 17 are formed at two portions such that an inner diameter of the opening has an outer size or width which enables that the outer peripheral portion of the collar 7 can easily pass, and the tongue-like members 8*c* of the rotation control member 8 can engage.

Further, the engaging rim 16 has a protruding amount or width, which does not interfere the outer shape of the main rod, in the longitudinal direction such that the collar 7 can be prevented from wobbling rearwardly when the collar 7 is rotated substantially 90 degrees (in case the collars 7 are provided at two portions in the diametral direction) after the collar 7 passes.

One engaging rim 16 and one passing part 17 may be provided respectively, or plural rims 16 and passing parts 17, i.e. three or more, may be provided.

Incidentally, through holes 18, 19, which are respectively provided at a central portion of the main rod 6 in the inserting member 4 and at a central portion of the receiving cylinder member 11 in the receiving member 5, communicate with an inner hole in the rotational shaft 1 to constitute a supply path which is used for a fluid such as pressurized air and water and supplies the same toward the soil at the distal end of digging so as to facilitate digging and removing the soil.

The connecting device A of the embodiment according to the present invention structured as described above has the following operation.

In accordance with moving the pipe members b forward in the ground from the departure or starting pit by the propulsion or digging apparatus (not shown), the pipe members b are gradually connected by welding for extension, and in correspondence therewith, the soil removing members 3, such as the auger screws, which are inserted and fitted inside the pipe members b to dig and remove the soils in front of the pipe member, have to be extended to correspond to the lengths of the pipe members b.

This operation is carried out inside the departure pit, and firstly, as shown in FIG. 1, the transmission member 9 of the inserting member 4 is inserted into the receiving member 5 disposed at the other rotation shaft 1 in the soil removing member 3.

At this time, a front edge of the rotation control member 8 abuts against the rear edge of the collar 7 at the rear portion of the main rod 6 against the pressing force of the retaining means 20, as shown in FIGS. 1 and 2.

Then, the transmission member 9 enters into the stopping cylinder 12, and the collar 7 corresponding to the passing parts 17 passes through the engaging rims 16. When the rotation control member 8 corresponds to the passing parts 17, the stopping cylinder 12 is rotated in a direction shown by an arrow p in FIG. 6(*a*). Then, the rotation control member 8 is rotated together with the stopping cylinder 12 while the rotation control member 8 is pushed by the outer edges of the engaging rims 16 at the passing parts 17.

At this moment, the receiving collar 7 and the engaging rims 16 are engaged with each other by the rotation of the stopping cylinder 12, so that the movement in the axial direction is limited.

Furthermore, in accordance with the rotation, when the tongue-like members 8*c* are moved to the position of the notch portions 10 where the collar 7 of the main rod 6 is not provided, as shown in FIGS. 4 and 6(*b*), the rotation control member 8 is pushed in the axial direction by the pressing force of the retaining means 20, so that the tongue-like members 8*c* engage the notch portions 10. Also, in the stopping cylinder 12, since both side portions of the tongue-like members 8*c* engage the passing parts 17, the rotation of the stopping cylinder 12 is limited.

Thus, the condition of the engagement between the collar 7 of the main rod 6 and the engaging rims 16 of the stopping cylinder 12 is maintained, so that the disengagement in the axial direction is prevented. Additionally, the connection of the inserting member 4 and the receiving member 5 in the rotation direction is made, and torque transmission in the rotation direction of the rotational shafts 1 and transmission of movement in the axial direction can be securely performed. Thus, the operation of removing soils can be smoothly carried out by the soil removing member 3 attached around the outer periphery thereof.

Also, in case the soil removing member 3 for the excavator is disassembled after finishing of laying the pipe members b underground, in the condition shown in FIGS. 4 and 6(*b*), when the rotation control member 8 is pulled back in the axis direction against the pressing force of the retaining means 20, distal ends of the tongue-like members 8*c* of the rotation control member 8 move from the notch portions 10, and are disengaged from the side edge portions of the collar 7.

Then, when the stopping cylinder 12 is rotated to a direction opposite to the arrow p in FIG. 6(*a*), the side edge portiones of the tongue-like members 8*c* of the rotation control member 8 are pushed by the outer edges of the engaging rims 16, and at the same time, the tongue-like members 8*c* are rotated together with the stopping cylinder 12. When the tongue-like members 8*c* are moved to the position where the collar 7 of the main rod 6 is located, the distal ends of the tongue-like members 8*c* abut against the outer surface of the receiving collar 7, so that the connection between the inserting member 4 and the receiving member 5 is released by pulling the rotational shaft 1 outwardly in this condition.

Figure 8:
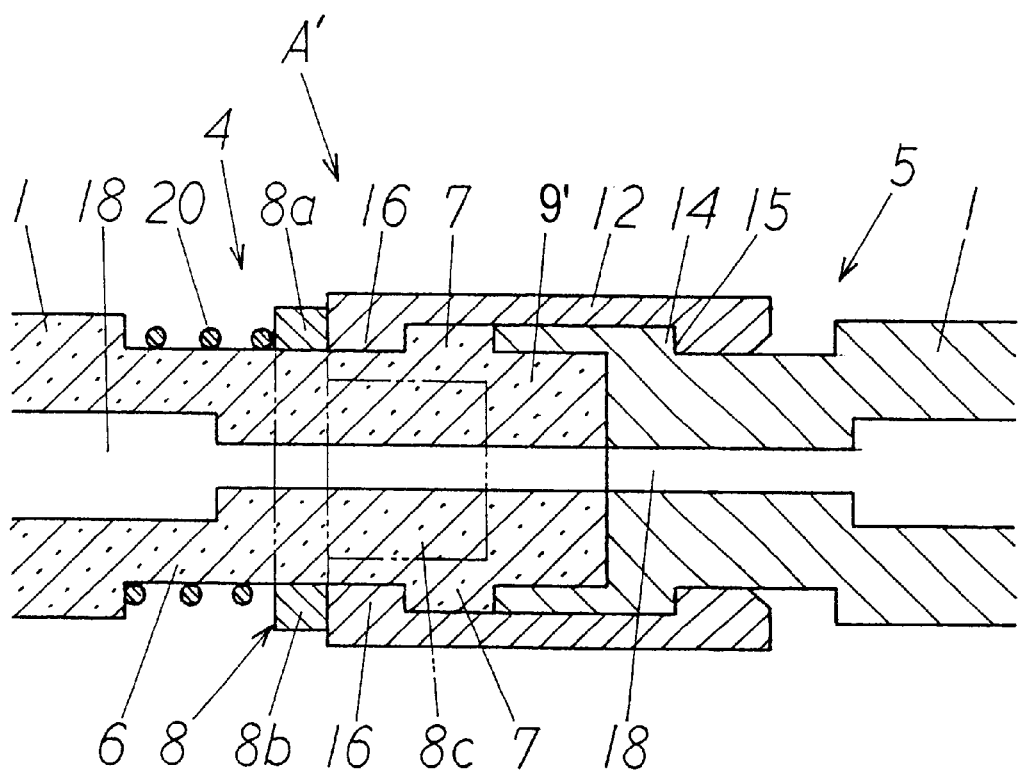
FIG. 8 is a front half-sectional view of another embodiment of the device in FIG. 1.
Figure 9A:
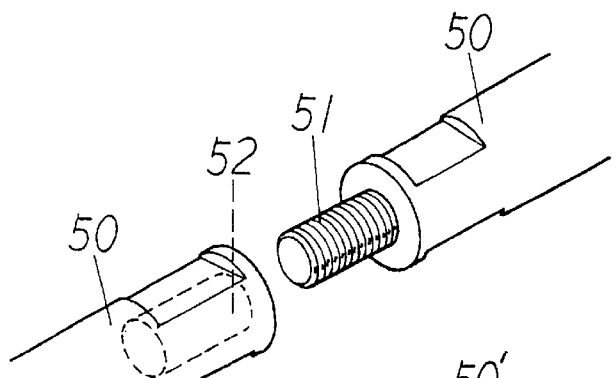
FIG. 9(a) through FIG. 9(d) are perspective views showing examples of the conventional auger screws.
Figure 9B:
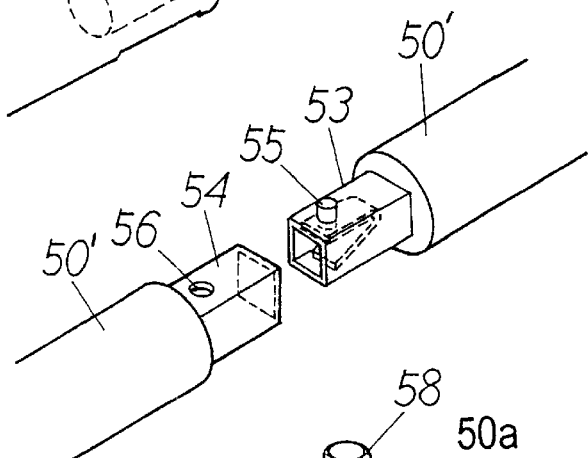
Figure 9C:
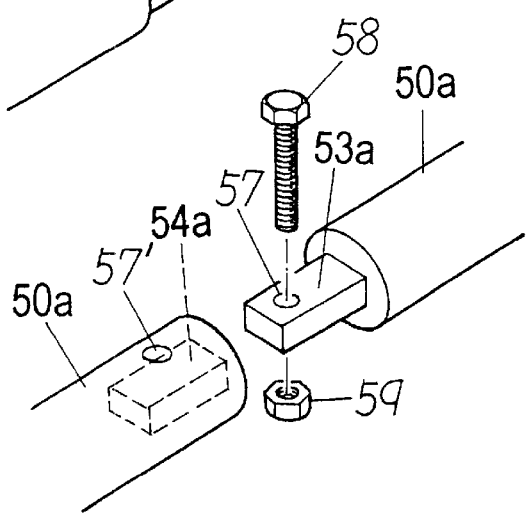
Figure 9D:
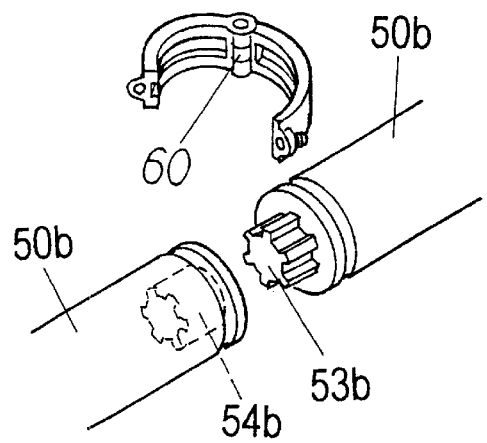

Incidentally, a connecting device A' of the soil removing member for the excavator shown in FIG. 8 is structured such that a transmission member 9' in the main rod 6 has a comparatively large diameter, so that the structure of the rotation transmission part becomes strong and durable to improve the transmission ability of the rotation torque.

As described above, in the connecting device of the soil removing member for the excavator according to the present invention, the soil removing member attached with the ejecting device, which is helical in the axial direction thereof, is extended by gradually connecting another rotational shaft in accordance with digging. The connecting device is formed of the inserting member provided at one end of the rotational shaft, and the receiving member provided at the other end of the rotational shaft corresponding to the inserting device. Accordingly, since the connection of the rotational shafts is carried out by easy one-touch operation in which the inserting member is fitted with or pulled out from the receiving member, a tool therefor is not necessary, so that the workability and work time are greatly improved.

Especially, even in case of connecting or disconnecting operation in the narrow departure or starting pit, the operation is simplified so as not to require much labor. Also, the simple structure does not causes breakdown, so that it does not prevent the operation of inserting the pipes because of frequent breakdown and troubles.

Also, since there is no projection around the outer peripheral portion of the connecting parts, the connecting device does not impede transferring of the dug soils or the like or does not resist the rotation, so that smooth removal of the dug soils can be performed.

Since the inserting member and the receiving member are connected by a surface connection between the transmission member and the transmission receiving hole, a rotation torque is dispersed at the abutting portions thereof, so that an eccentric load is not applied.

While the invention has been explained with reference to the specific embodiments of the invention, the explanation is illustrative and the invention is limited only by the appended claims.

What is claimed is:

1. A connecting device of a soil removing member for an excavator, comprising:

a rotational shaft having a helical ejection blade attached to an outer periphery of the rotational axis, an inserting member attached to one end of the rotational shaft, said inserting member including a main rod having a transmission member protruding from one side of the main rod; a collar protruding radially outwardly from an outer periphery of the main rod; and a rotation control member rotatably attached to the main rod parallel to the collar in an axial direction, said rotation control member selectively moving between a peripheral position disposed in a periphery same as that of the collar and an outside position disposed axially outwardly with respect to the collar in the outer periphery of the main rod, and a receiving member attached to the other end of the rotational shaft to correspond to the inserting member, said receiving member including a receiving portion attached to the rotational shaft and having a concave for engaging a transmission member of a main rod of another soil removing member; and a hollow stopping member freely rotatably attached to an outer periphery of the receiving portion and having an engaging rim, said stopping member engaging a collar of the main rod of said another soil removing member to connect two soil removing members.

2. A connecting device according to claim 1, wherein the inserting member includes retaining means for retaining a position of the rotation control member when the rotation control member is in the peripheral position disposed in the periphery same as that of the collar.

3. A connecting device according to claim 2, wherein the retaining means is a spring for urging the rotation control member outwardly in the axial direction.

4. A connecting device according to claim 1, wherein said soil removing member includes the inserting member at one end and the receiving member at the other end thereof, the inserting member in one soil removing member being connected to the receiving member in said another soil removing member to extend the soil removing members.

5. A connecting device according to claim 1, wherein said main rod having the inserting member and the receiving member has a through hole in a center thereof, said through hole constituting a supply path for a fluid.

6. A connecting device according to claim 1, wherein said rotation control member includes a cylindrical portion and at least two tongues extending from the cylindrical portion parallel to the longitudinal direction of the shaft, and said color includes at least two recessed portions, said tongues being located in recessed portions when the rotation control member is in the peripheral position.

7. A connecting device according to claim 6, wherein said hollow stopping member includes at least two engaging rims, each engaging rim having a size corresponding to each recessed portion of the color to allow the engaging rim to enter into the recessed portion.

* * * * *